(12) United States Patent
Lee et al.

(10) Patent No.: US 9,961,549 B2
(45) Date of Patent: May 1, 2018

(54) RIGHT OBJECT ACQUISITION METHOD AND SYSTEM

(75) Inventors: Kyung Keun Lee, Daegu (KR); Jong Kerl Lee, Gumi-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 877 days.

(21) Appl. No.: 12/156,490

(22) Filed: Jun. 2, 2008

(65) Prior Publication Data

US 2008/0307530 A1   Dec. 11, 2008
US 2018/0014196 A9   Jan. 11, 2018

(30) Foreign Application Priority Data

Jun. 9, 2007   (KR) ........................ 10-2007-0056400

(51) Int. Cl.
*H04W 12/08*   (2009.01)
*G06F 21/10*   (2013.01)
*H04L 29/06*   (2006.01)

(52) U.S. Cl.
CPC ............ *H04W 12/08* (2013.01); *G06F 21/10* (2013.01); *H04L 63/10* (2013.01); *H04L 2463/101* (2013.01)

(58) Field of Classification Search
USPC ..................................................... 705/50–79
See application file for complete search history.

(56) References Cited

U.S. PATENT DOCUMENTS

| | | | |
|---|---|---|---|
| 7,117,180 B1 * | 10/2006 | Stefik .................. | G06F 21/10 380/200 |
| 8,209,535 B2 | 6/2012 | Lee et al. | |
| 2003/0126086 A1 | 7/2003 | Safadi | |
| 2004/0024688 A1 | 2/2004 | Bi et al. | |
| 2004/0039916 A1 * | 2/2004 | Aldis ...................... | G06F 21/10 713/177 |
| 2006/0095792 A1 * | 5/2006 | Hurtado et al. ............... | 713/189 |
| 2006/0230145 A1 | 10/2006 | Zarakhovsky et al. | |
| 2007/0006327 A1 * | 1/2007 | Lal et al. ........................ | 726/31 |

(Continued)

FOREIGN PATENT DOCUMENTS

| | | |
|---|---|---|
| EP | 1 947 587 A1 | 7/2008 |
| JP | 2002-297945 | 10/2002 |

(Continued)

OTHER PUBLICATIONS

"Digital Rights Management in the Online Music Business"— published 2002 (Year: 2002).*

(Continued)

*Primary Examiner* — James M Detweiler

(57) ABSTRACT

A batch rights objects (ROs) acquisition method and system is provided to enable a mobile terminal to acquire multiple rights objects in a batch processing manner. A rights object acquisition method according to an embodiment of the present invention includes transmitting a rights object request message requesting one or more rights objects of content objects from a mobile terminal to a rights issuer; creating, at the rights issuer, a rights object response message containing at least one of rights objects indicated by the rights object request message and at least one signature in response to the rights object request message; and transmitting the rights object response message from the rights issuer to the mobile terminal.

10 Claims, 8 Drawing Sheets

(56) References Cited

U.S. PATENT DOCUMENTS

| | | | |
|---|---|---|---|
| 2007/0150967 A1* | 6/2007 | Takahashi | G06F 21/10 726/31 |
| 2007/0208668 A1* | 9/2007 | Candelore | 705/57 |
| 2008/0010457 A1 | 1/2008 | Lee et al. | |
| 2008/0033992 A1* | 2/2008 | Sloo et al. | 707/104.1 |
| 2008/0256592 A1* | 10/2008 | Schnell | G06F 21/10 726/1 |

FOREIGN PATENT DOCUMENTS

| | | | | |
|---|---|---|---|---|
| KR | 10-2005-0114442 | | 12/2005 | |
| KR | 10-2007-0040322 | | 4/2007 | |
| WO | WO-2006018030 A1 * | 2/2006 | | G06F 8/65 |

OTHER PUBLICATIONS

Harikrishna Vasanta, et al., "Distributed Management of OMA DRM Domains", Information Security Applications, vol. 4298, Aug. 28, 206, p. 237-251.

European Search Report dated Dec. 17, 2008 in connection with European Patent Application No. EP 08 15 7047.

European Examination Report dated Jul. 12, 2013 in connection with European Application No. 08157047.5, 5 pages.

Open Mobile Alliance, "DRM Specification, Draft Version 2.1, OMA-TS-DRM-V2_1-20060523-D", May 23, 2006, 142 pages.

* cited by examiner

RIGHT OBJECT ACQUISITION METHOD AND SYSTEM

CROSS-REFERENCE TO RELATED APPLICATION(S) AND CLAIM OF PRIORITY

The present invention claims priority to an application entitled "RIGHTS OBJECT ACQUISITION METHOD AND SYSTEM" filed in the Korean Intellectual Property Office on Jun. 9, 2007 and assigned Serial No. 2007-0056400, the contents of which are incorporated herein by reference.

TECHNICAL FIELD OF THE INVENTION

The present invention relates to a Digital Right Management (DRM) system for use with mobile terminals and, in particular, to a batch rights objects (ROs) acquisition method and system which enables a mobile terminal to acquire multiple rights objects in a batch processing manner.

BACKGROUND OF THE INVENTION

With the widespread use of Internet and advances of the multimedia and communication technologies, various digital contents are distributed and acquired over the network. However, without copyright protection policy, the advanced network environment and technologies are likely to be used for illegal distributions of the contents.

Digital Rights Management (DRM) systems have been developed to prevent the illegal use and distribution of the copyrighted contents. DRM is a term that refers to access control technologies for protecting the copyrights of the authors and the content providers.

The DRM is specified to provide a controlled consumption of digital contents and to protect the intellectual property right of the authors and the content providers.

Typically, encrypted DRM contents can be freely accessed and downloaded. In order to use the DRM contents, however, a license called Rights Object (RO) is required for decoding the encrypted DRM contents. With its efficient usage control, DRM is used by many copyright holders.

DRM technologies attempt to protect the digital contents through all the phases of creation, distribution, use, and abrogation; and restricts access and usage rights of the user on the digital contents. DRM allows the user having a valid encryption key such as RO to decode the encrypted digital content such that the digital content can be protected even when being illegally distributed.

The RO is a container used in the OMA DRM system, which is an open DRM standard invented by the Open Mobile Alliance (OMA), for carrying the license key to decrypt the corresponding DRM contents. The RO is issued by a Right Issuer (RI) and purchased by the end user. Since the digital content and corresponding RO are delivered in a detached manner, the usage of the downloaded content is restricted to the user who acquired the corresponding RO.

The RO is a collection of Permission, Constraints, and other attributes that define under what circumstances access is granted to, and what usages are defined for, DRM content object. Typically, the usage constraints include Count, Date-Time, Interval, Timed-Count, Accumulated, and Individual. The constraints are stored in a specific field of the RO.

For example, the RO may specify the usage for an MP3 file with the count constraint value set to "10". In this case, the MP3 file can be played 10 times and the count is decremented by 1 whenever the MP3 file is played. If the count value becomes "0", the usage right on the MP3 file expires. In order to maintain the usage right on the MP3 file, the corresponding RO should be updated.

FIG. 1 is a diagram illustrating RO delivery procedure in a conventional DRM system.

In FIG. 1, a mobile terminal 101 transmits a content request message (105) to content server 102, and the content server 102 transmits a corresponding content 106 in response to the content request message 105. In a case that the requested content is a DRM protected content, the content is encrypted with an encryption key and scheme specified by the DRM and transmitted in a DRM format having the constraints (e.g., usage rule, the number of times to be played, and duration). If a user request for acquiring the license to the downloaded content is detected, the mobile terminal 101 transmits a license request message 107 to a Right Issuer (RI) 103, and the RI 103 transmits the corresponding license 108 to the mobile terminal 101 in response to the license request message. Here, the license is a usage right on the content which includes a decryption key and usage constraint information. In the case of DRM content object, the mobile terminal 101 should acquire the usage right for consuming the content. Accordingly, the RI 103 checks whether the identity of the user of the mobile terminal 101 is valid. If it is determined that the user is valid, the RI 103 transmits the license to the mobile terminal 101. If the license is received from the RI 103, the mobile terminal 101 can play the content using the license. Typically, the decryption key and usage constraint information is extracted from the license by a DRM client application installed in the mobile terminal 101. The content is decrypted by using the decryption key and played under the usage constraints specified in the license.

However, the conventional DRM system has a drawback in that the RO acquisition or update process is performed item by item such that it is time consuming and cumbersome to acquire or update multiple ROs. That is, since the ROs required for consuming DRM content objects are purchased one by one, the user should perform the purchasing process repeatedly as many as the number of the DRM content objects, resulting in user inconvenience.

For example, when it is decided to update the expired usage rights on a MP3 file, a video file, and a game file, the user should purchase the ROs of the MP3, video, and game files one by one through respective purchase transactions. These repeated RO purchase transactions are time-consuming and cumbersome, resulting in contents management inefficiency and user inconvenience.

SUMMARY OF THE INVENTION

To address the above-discussed deficiencies of the prior art, it is a primary object of the present invention to provide a batch RO acquisition method and system of a mobile terminal that that is capable of acquiring and updating multiple ROs through a simplified process.

Also, the present invention provides a batch RO acquisition method and system of a mobile terminal that is capable of improving protected contents management efficiency by acquiring multiple ROs in a batch processing manner.

Also, the present invention provides a batch RO acquisition method and system of a mobile terminal that is capable purchasing and authenticating multiple ROs in a batch processing manner by introducing a broker server.

In accordance with an exemplary embodiment of the present invention, a rights object acquisition method includes transmitting a rights object request message requesting one or more rights objects of content objects from a mobile terminal to a rights issuer; creating, at the rights issuer, a rights object response message containing at least one of rights objects indicated by the rights object request message and at least one signature in response to the rights object request message; and transmitting the rights object response message from the rights issuer to the mobile terminal.

In accordance with another exemplary embodiment of the present invention, a rights object acquisition method includes transmitting a rights object request message requesting one or more rights objects of content objects from a mobile terminal to a first rights issuer; creating, at the first rights issuer, a first rights object response message containing at least one of rights objects indicated by the rights object request message and at least one signature; transmitting the rights object request message and the first rights objects response message from the first rights issuer to a second rights issuer designated in the rights object request message; creating, at the second rights issuer, a second rights object response message containing at least one of rights objects indicated by the rights object request message and at least one signature; and transmitting, when no other rights issuer designated in the rights object request message remains, the second rights object response message from the second rights issuer to the mobile terminal.

In accordance with another exemplary embodiment of the present invention, a rights object acquisition method includes transmitting a rights object request message requesting one or more rights objects of content objects from a mobile terminal to a first rights issuer; transmitting the rights object request message from the first rights issuer to a second rights issuer designated in the rights object request message; transmitting a rights object response message containing at least one of the rights objects indicated by the rights object request message and the first rights issuer's signature from the first rights issuer to the mobile terminal; and transmitting a right object response message containing at least one of the rights objects indicated by the rights object request message and the first rights issuer's signature from the first rights issuer to the mobile terminal.

In accordance with another exemplary embodiment of the present invention, a rights object acquisition system includes a mobile terminal which requests and acquires at least one rights object of at least one content object in a batch processing manner; and a server which performs authentication of the mobile terminal and provides the mobile terminal with the at least one rights objects in a batch processing manner.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

In the present invention, a Rights Object (RO) acquisition method and system is provided. The RO acquisition method and system of the present invention enables a mobile terminal to acquire ROs for multiple Digital Rights Management (DRM) protected content items in an aggregation manner. In the RO acquisition method system according to the present invention, the management processes such as content purchase, RO acquisition and update, and authentication are performed by means of a broker server. In the following, the term "RO acquisition" is used in the meaning including "RO update" in order to simplify the explanation.

In the following, the mobile terminal can be one of the various kinds of devices including cellular phones supporting data and voice communications according to various radio communication standards, Portable Multimedia Player (PMP), MP3 player, Digital Broadcast Receiver, Personal Digital Assistant (PDA), laptop and desktop computer, and their equivalents supporting a wired or wireless communication.

Figure 1:
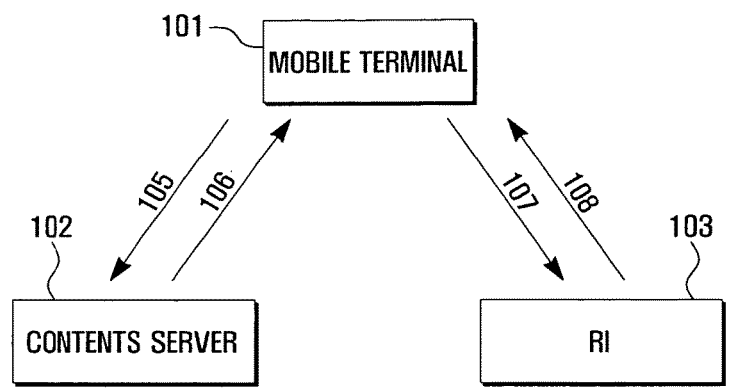
FIG. 1 is a diagram illustrating RO delivery procedure in a conventional DRM system.
Figure 2:
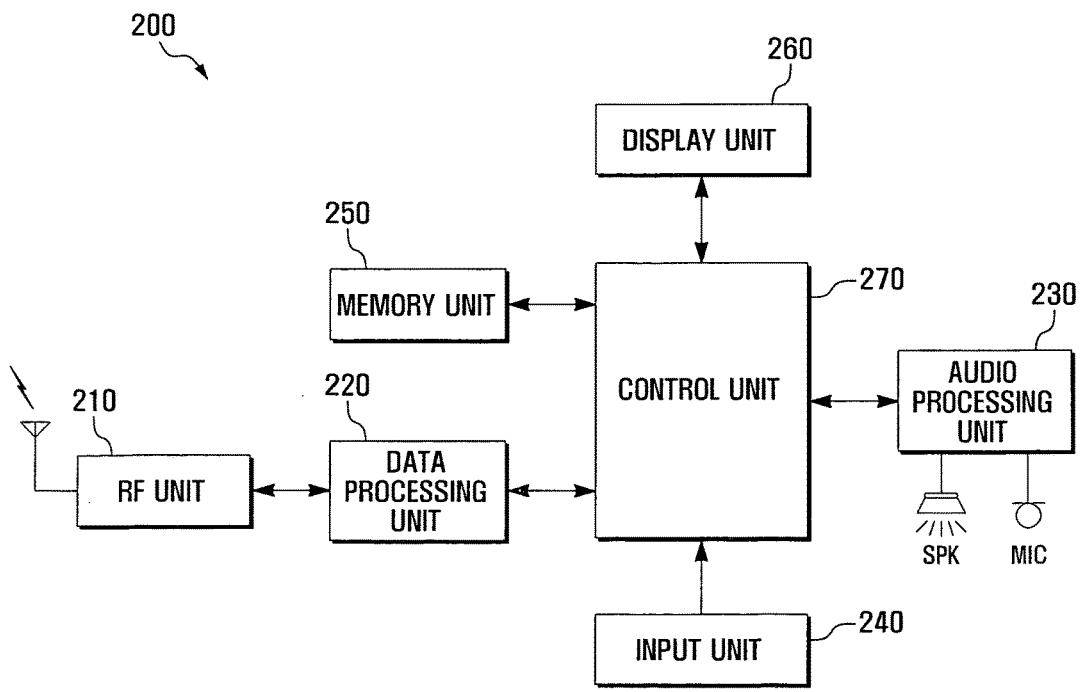
FIG. 2 is a block diagram illustrating a configuration of a mobile terminal according to an exemplary embodiment of the present invention.

FIG. 2 is a block diagram illustrating a configuration of a mobile terminal according to an exemplary embodiment of the present invention. Although a mobile phone is depicted as the mobile terminal in FIG. 2, the present invention is not limited to the mobile phone.

As shown in FIG. 2, the mobile terminal 200 includes a radio frequency (RF) unit 210, a data processing unit 220, an audio processing unit 230, an input unit 240, a memory unit 250, a display unit 260, and a control unit 270.

Referring to FIG. 2, the RF unit 210 is responsible for radio communication of the mobile terminal 200. The RF unit 210 establishes a radio communication channel with a communication system according to a specific communication scheme. Particularly, the RF unit 210 allows the mobile terminal 200 to exchange control messages with a web server for acquiring the contents and their ROs. The RF unit 210 includes an RF transmitter for up-converting and amplifying the transmission signals and an RF receiver for low-noise amplifying and down-converting the received signals.

The RF unit 210 allows the mobile terminal 200 to download DRM contents from a contents server and ROs required for playing the DRM contents from a Rights Issuer (RI) or a Broker server. The RF unit 210 transmits a Right Object Acquisition Protocol (ROAP) Trigger Request and RO Request messages to the RI or Broker server and receives ROAP Trigger message and RO Response message. These messages are described in more detail later.

The data processing unit 220 is responsible for processing voice data input by the audio processing unit 230, text data input through the input unit 240, and the data incoming from and outgoing to the RF unit 210. The data processing unit 220 may include a modem and a codec. The codec includes a data codec for processing packet data and an audio codec for processing audio data.

The audio processing unit 230 processes the audio signal output by the data processing unit 220 so as to output the audio signal through a speaker (SPK) in the form of audible sound and processes the audio signal input through a microphone (MIC) so as to output the processed audio signal to the data processing unit 220. The audio processing unit 230 outputs audio data including voice data through the speaker (SPK) in the form of audible sound and outputs the audio signal including voice input through the microphone (MIC) to the data processing unit 220 in the form of audio data.

Particularly, the audio processing unit 230 is configured to play the audio data contained in the DRM contents selected by a user.

The input unit 240 receives various alphanumeric key inputs and function key inputs for configuring and controlling functions of the mobile terminal 200 and transfers the key sequences corresponding to the key inputs to the control unit 270. The input unit 240 can be implemented with at least one of a touchpad, a normal keypad, a touchscreen, a qwerty keyboard, and specific types of function keys. Particularly, the input unit 240 generates a key signal for selecting an item listed on a list (DRM contents list or ROs list by content item) displayed on the display unit 260 and transfers the key signal to the control unit 270. Of course, multiple items can be selected from the list in response to the user's requests.

The memory unit 250 stores at least one application for executing functions associated with the RO acquisition method and user data collected from external devices (contents server, RI, Broker server, and another mobile terminal). The user data include phonebook data, still and motion picture files, audio files, other types of digital contents, DRM-protected contents, and RO. The application can be a program associated with playback of the user data. Particularly, the application can be a content management program for managing and controlling the use of DRM-protected contents. The memory unit 250 may include at least one buffer for buffering user data generated during the operation of the application.

The memory unit 250 stores at least one kind of content information associated with each DRM content object. The content information includes a size, a data type, a title, a playable period, a playable number of times, content-related information, a usage restriction, etc. Particularly, the memory unit stores ROs of each DRM content object.

The display unit 260 displays screens representing the data generated by the application and key manipulation status and preset function information. The display unit 260 can be implemented with a Liquid Crystal Display (LCD). The LCD may have touchscreen functionality. In this case, the display unit 260 operates as a part of the input unit 240.

The control unit 270 controls general operations of the mobile terminal 200 and signaling among the internal components of the mobile terminal 200. The control unit 270 controls interoperation of the data processing unit 220, audio processing unit 230, input unit 240, memory unit 250, and display unit 260. The control unit 270 may include the data processing unit 220.

Particularly, the control unit 270 controls package purchase of multiple DRM contents items and batch RO acquisition for the DRM contents items. The control unit 270 also controls display of the DRM contents item list, presentation of the items selected from the DRM contents item list, and purchase information of the DRM contents items and ROs. The control unit 270 also controls generation of the ROAP Trigger Request message and RO Request message.

Although the configuration of the mobile terminal is schematically depicted in FIG. 2, the present invention is not limited thereto. For example, the mobile terminal 200 may further include at least one of camera module, electric settlement module, Bluetooth module, battery module, and digital broadcast receiver module, and other optional function modules. Also, any of the internal components constituting the mobile terminal may be omitted or replaced with an equivalent functional component according to the functional design of the mobile terminal.

Now, a method for acquiring ROs of DRM contents items (called DRM-RO hereinafter) is described with reference to the operation of the above structured mobile terminal.

Figure 3:
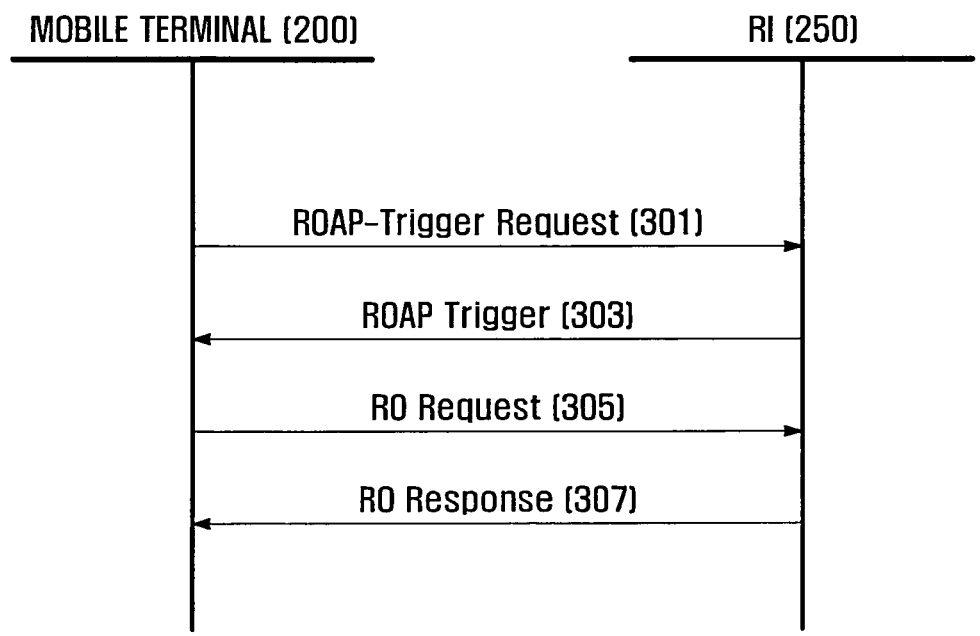
FIG. 3 is a message flow diagram illustrating a batch DRM-RO acquisition method according to an exemplary embodiment of the present invention.

FIG. 3 is a message flow diagram illustrating a batch DRM-RO acquisition method according to an exemplary embodiment of the present invention.

Referring to FIG. 3, if an RO acquisition command is input for acquiring ROs, the mobile terminal 200 generates an ROAP Trigger Request message and sends the ROAP Trigger Request message to the RI 250 (S301). The ROAP Trigger Request message includes at least one content identifier (CID). The ROAP Trigger Request message also includes a device identifier (DeID) of the mobile terminal 200 and at least one constraint for restricting the usage rights of at least one DRM content object.

In a case that a parent license of at least two child licenses exists, the ROAP Trigger Request message may further includes parent license information. For example, in order to acquire two ROs for a track 1 and a track 3 dependent on a music album A, the ROAP Trigger Request message may include an identifier of the music album A in addition to the identifiers of the track 1 and track 3. In this case, the ROs for the track 1 and track 3 can be acquired only with the RO for the album A afterward.

By constraining the play permissions of the track 1 and track 3 with a parent RO, either track 1 and track 3 can be played up to a total usage times restricted by a constraint of the parent RO.

Also, different parent licenses can be applied. For example, the user may create a content list (e.g., my list and favorite list) as a parent group. In this case, the ROs of the content items listed in the content list are dependent on a group rights object for the content list.

The DRM content object can be a content item that is received from another device (for example, another terminal or server) but has not acquired corresponding RO or of which RO has expired.

The mobile terminal 200 selects an RI for purchasing an RO of at least one DRM content object with reference to an RI's Uniform Resource Location (URL) information contained in the header information of the DRM content object. The ROAP Trigger Request message is sent to the RI URL.

In this embodiment, a DRM Content Format (DCF) having an additional field indicating the address of the RI is proposed for acquiring multiple ROs in an aggregate manner.

Figure 4:
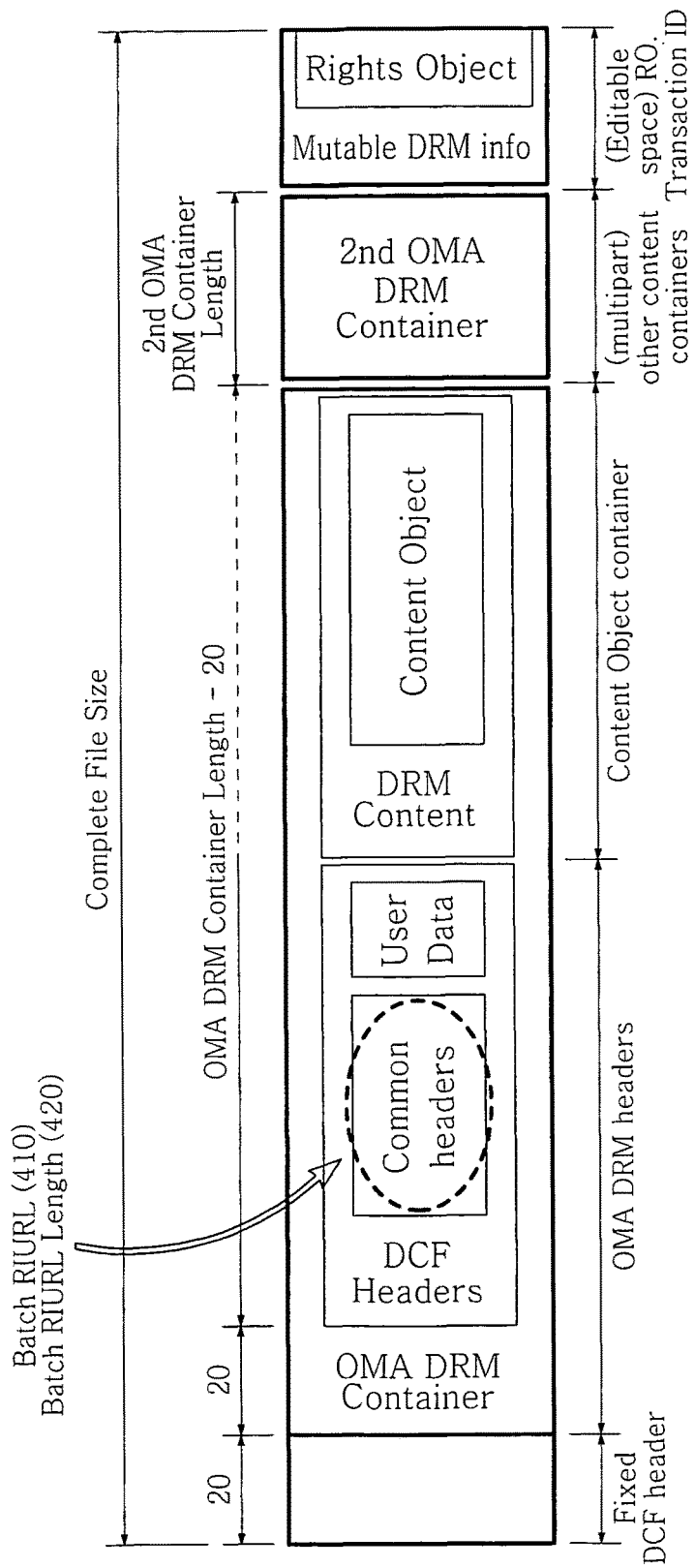
FIG. 4 is a diagram illustrating a structure of DCF for use in a batch RO acquisition method according to an exemplary embodiment of the present invention.

FIG. 4 is a diagram illustrating a structure of DCF for use in a batch RO acquisition method according to an exemplary embodiment of the present invention.

In FIG. 4, a BatchRIURL 410 is an address of RI which supports a batch RO acquisition, and a BatchRIURLLength 420 indicates a length of the BatchRIURL 410. The batch RI information field is added to the Common Header of the DCF as a mandatory field or as an extended header field which is one of mandatory fields contained in the common header.

Returning to FIG. 3, the mobile terminal 200 selects an RI for acquiring the ROs for at least one DRM contents item with reference to the RI URL address previously stored in the memory unit 250 and attempts to access the RI. Also, the mobile terminal 200 can request a Batch RI URL for acquiring the DRM ROs to the RI 250 and attempts to access the RI URL responded by the RI 250. The RI URL received from the RI 250 is stored and used for acquiring the ROs later in an aggregate manner.

If the ROAP Trigger Request message is received, the RI 250 generates an ROAP Trigger message and sends the ROAP Trigger message to the mobile terminal 200 (S303). The ROAP Trigger message may include price information on the ROs of the content items indicated by the ROAP Trigger Request message. Also, the ROAP Trigger message includes one or more roIDs to identify the ROs corresponding to the content items. The ROAP trigger message may include at least one of roapURL, RI ID, RI Alias, Domain ID, Domain Alias, and Nonce.

The ROAP Trigger request message and ROAP Trigger message can be sent in the form a HTTP GET or a HTTP POST (see RO acquisition mechanism of OMA DRM v2.0). In a group RO acquisition method for acquiring multiple ROs simultaneously, the message length may increase, whereby HTTP POST prefers to send the ROAP messages.

If the ROAP Trigger message is received, the mobile terminal 200 displays information on the purchase prices of the ROs of the DRM contents items on the display unit with reference to the information contained in the ROAP trigger message.

Next, the mobile terminal 200 generates a RO Request message and transmits the RO Request message to the RI 250 (S305). At this time, the DRM content objects indicated by the RO Request message may be identical with those indicated by the ROAP Trigger Request message or not. That is, the list of ROs can be modified by the user.

If the RO Request message is received, the RI 250 issues the ROs indicated by the RO Request message and transmits an RO Response message (S307) containing the ROs to the mobile terminal 200.

Upon receiving the RO Response message, the mobile terminal 200 extracts ROs from the RO Response message so as to acquire multiple ROs in an aggregate manner.

The RO Response may further include a session ID for establishing a session between the RI 250 and the mobile terminal 200 so as to check whether the RO acquisition is successfully.

In this case, the mobile terminal 200 establishes a session with the RI 250 on the basis of the session ID and transmits an RO Confirm Request message to the RI 250 in the session. The RO Confirm Request message includes a parameter such as RO Confirm Info for indicating the successful RO acquisition.

In the RO Confirm Request message is received, the RI 250 ends the RO acquisition procedure or retransmits the ROs on the basis of RO Confirm Info. If it is determined that the multiple ROs are successfully delivered, the RI 250 transmits an RO Confirm Response message to the mobile terminal 200.

In addition to the steps of FIG. 3, the mobile terminal 200 may perform a web transaction with the RI 250 after transmitting the ROAP Trigger Request message. At this time, the permissions and constraints on the use of DRM contents can be negotiated. For example, the RI 250 publishes purchase prices information of the content items listed in the ROAP Trigger Request message, and the mobile terminal transmits the information on the content items that are finally confirmed by the user to the RI 250. If the web transaction is completed by the final user confirmation, the RI 250 may transmit a ROAP Trigger message listing the content items to be delivered to the mobile terminal 200.

The batch RO acquisition can be implemented without adding the BatchRIURL field to the DCF structure.

Figure 5:
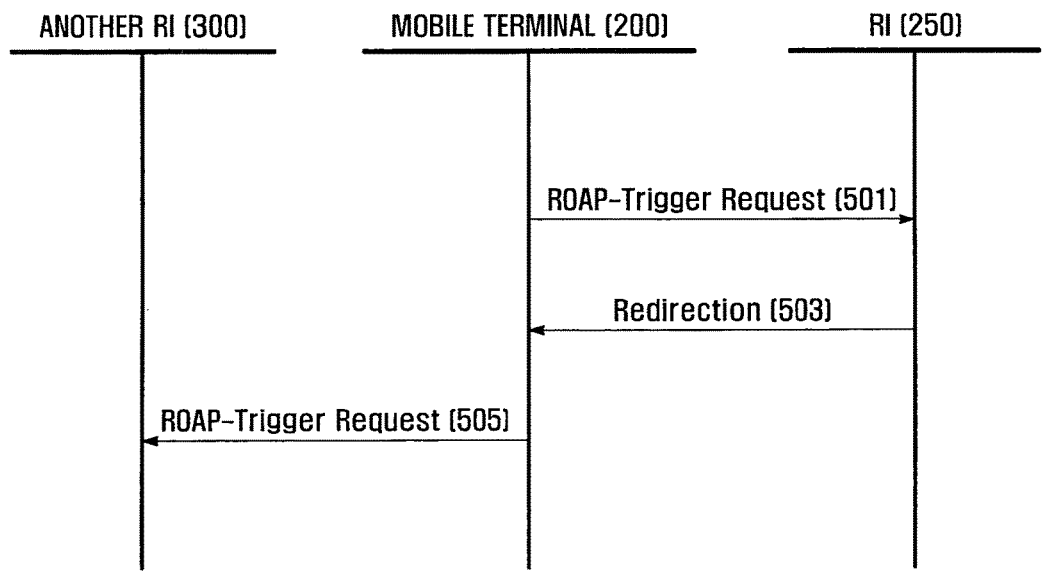
FIG. 5 is a message flow diagram illustrating a batch DRM-RO acquisition method according to another exemplary embodiment of the present invention.

FIG. 5 is a message flow diagram illustrating a batch DRM-RO acquisition method according to another exemplary embodiment of the present invention. In this embodiment, the BatchRIURL is not provided in the DCF structure, but, each content item has the URL of RI delivered the content item.

Referring to FIG. 5, if a batch RO acquisition command is input by the user, the mobile terminal 200 generates a ROAP Trigger Request message containing CIDs of individual DRM content objects and sends the ROAP Trigger Request message to the RI 250. Here, the mobile terminal 200 sends the ROAP Trigger Request message (S501) to the RI 250 with reference to an RI URL of one of multiple DRM content objects.

If the RI 250 received the ROAP Trigger Request message has no group RO transmission capability, the RI 250 sends a Redirection message notifying a new URL of another RI, which has the group RO transmission capability, to the mobile terminal 200 (S503). The Redirection message can be one of HTTP 302, HTTP 303, and HTTP 307 messages proposed in OMA DRM.

If the Redirection message is received, the mobile terminal 200 transmits the ROAP Trigger Request message to the RI 300 indicated by the RI URL contained in the Redirection message (S505). Accordingly, the mobile terminal 200 acquires the ROs from the RI 300 in an aggregation manner.

As described above, the batch RO acquisition method according to an exemplary embodiment of the present invention allows the mobile terminal to acquire multiple ROs in the aggregation manner through a signal purchase procedure, resulting in improving user convenience.

A multi-RI involved batch RO acquisition method, in which individual ROs are acquired from different RIs in a batch manner, is described hereinafter.

Figure 6:
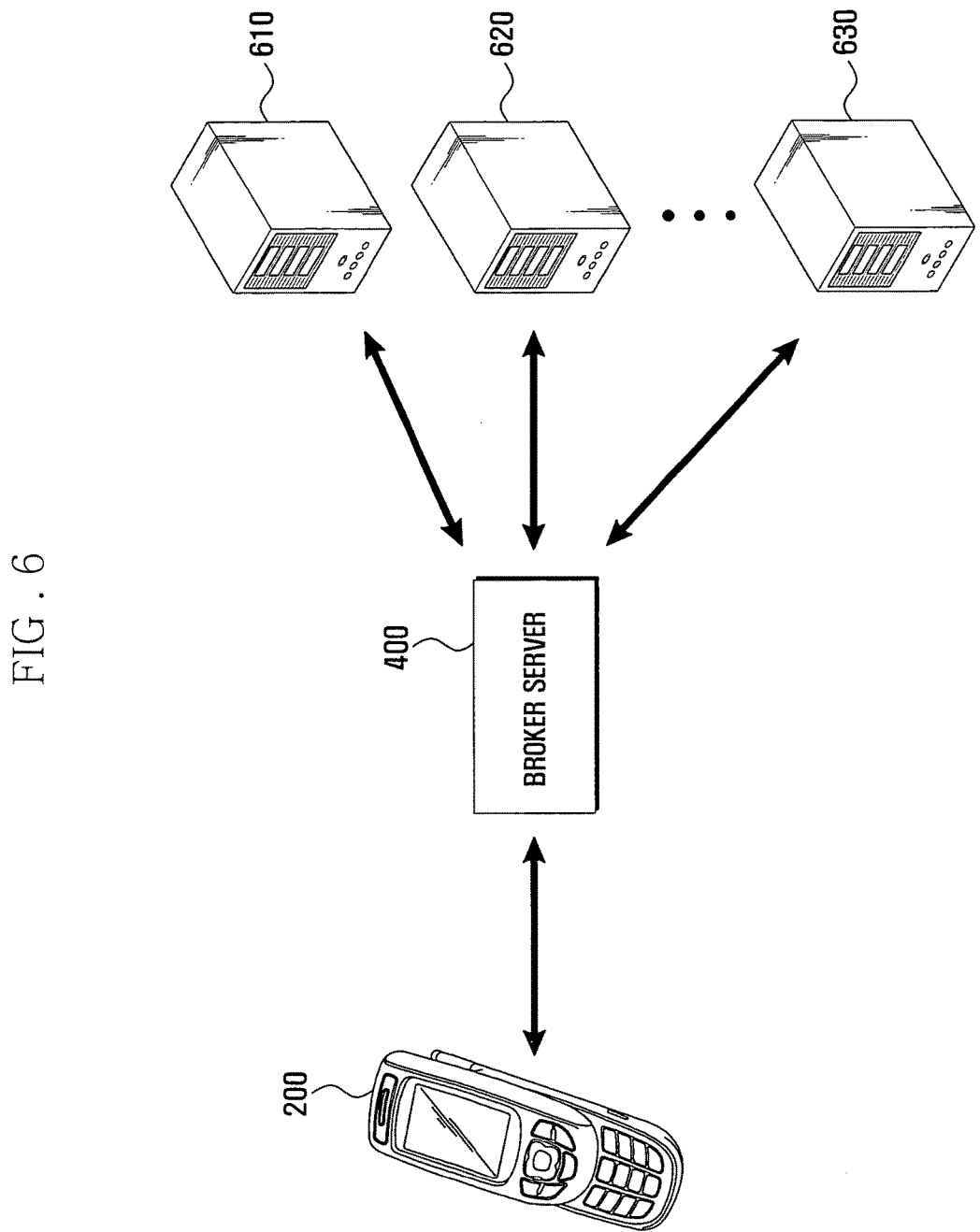
FIG. 6 is a schematic diagram illustrating a batch DRM-RO acquisition system according to an exemplary embodiment of the present invention.

FIG. 6 is a schematic diagram illustrating a batch DRM-RO acquisition system according to an exemplary embodiment of the present invention.

As shown in FIG. 6, a batch DRM-RO acquisition system according to an embodiment of the present invention includes a mobile terminal 200, a plurality of RIs 610 to 630, and a Broker server 400 located between the mobile terminal 200 and the arbitrary number of RIs.

The Broker server 400 acts as a signal service point for managing processes associated with RO acquisition (message generation and exchange, authentication, and digital signature, etc.). The broker server-involved batch RO acquisition procedure is described hereinafter in more detail with reference to FIG. 7.

Figure 7:
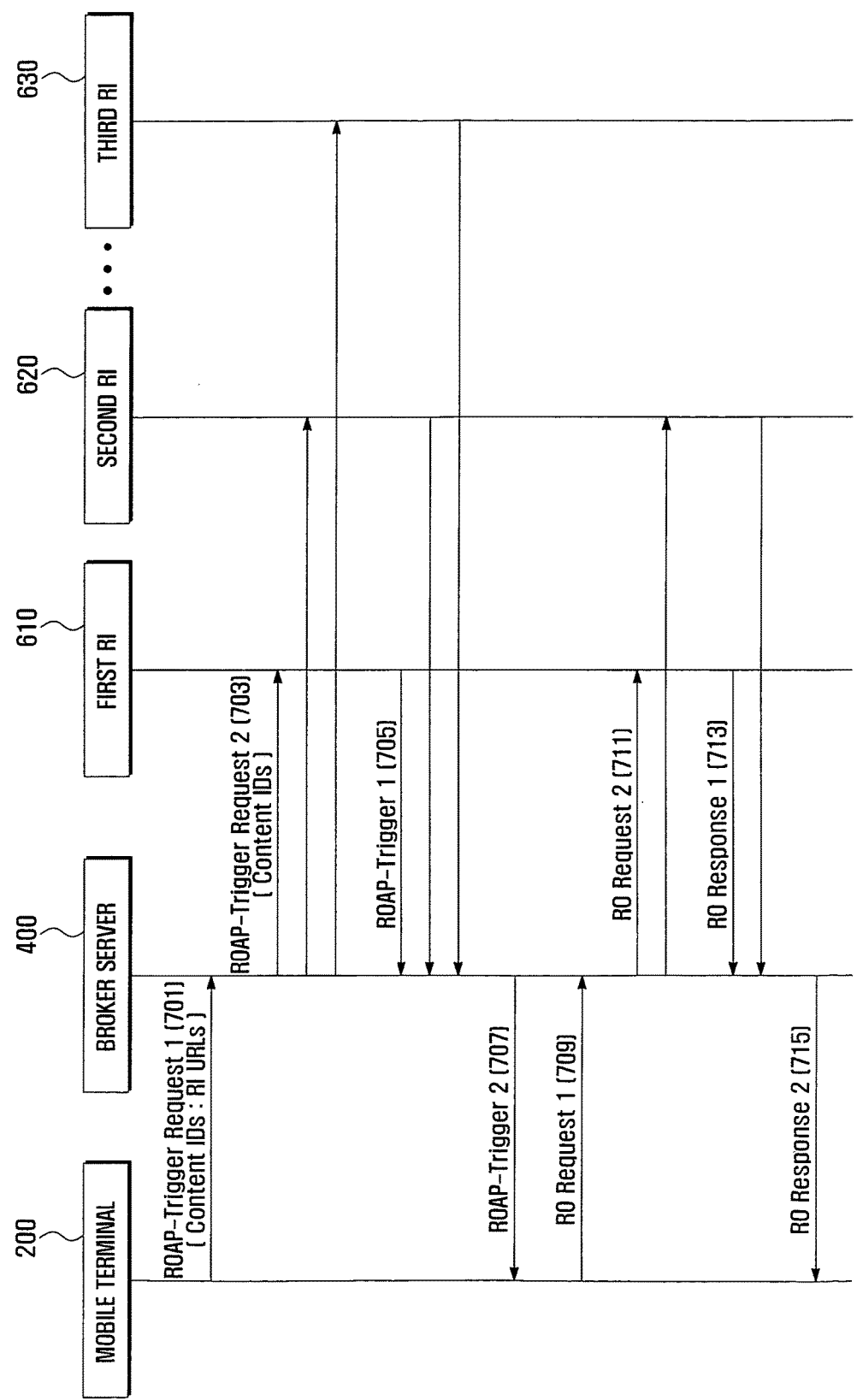
FIG. 7 is a message flow diagram illustrating a batch RO acquisition method according to another exemplary embodiment of the present invention.

FIG. 7 is a message flow diagram illustrating a batch RO acquisition method according to another exemplary embodiment of the present invention.

Referring to FIG. 7, if an RO acquisition command is input, the mobile terminal 200 generates an ROAP Trigger Request message containing a CID list listing CIDs of DRM content objects indicated by the RO acquisition command and transmits the ROAP Trigger Request message to the broker server 400 (S701). The ROAP Trigger Request message is structured identically with those of the other embodiments depicted in FIGS. 3 and 5. The ROAP Trigger Request message may further include RI URLs of the RIs 610 to 630 that provide the respective content objects indicated by the CIDs.

If the ROAP Trigger Request message is received, the broker server 400 extracts the CIDs of the content objects from the ROAP Trigger Request message by RI URL and generates new ROAP Trigger Request messages destined to the RIs 610 to 630 corresponding to the respective RI URLs. Next, the broker server 400 transmits the new ROAP Trigger Request messages to the corresponding RIs 610 to 630 (S703). At this time, each new ROAP Trigger Request message contains at least one CID of the content object provided by the RI to which it is destined.

Each of the RIs 610 to 630 receives only the new ROAP Trigger Request message having its RI URL. In response to the new ROAP Trigger Request message, each RI transmits an ROAP Trigger message to the broker server 400 (S705). The ROAP trigger message contains purchase information on the content objects indicated by the CIDs listed on the CID list of extracted from the new ROAP Trigger Request message. The ROAP trigger messages are structured identically with those of the embodiments depicted in FIGS. 3 and 5.

The broker server 400 receives the ROAP Trigger messages transmitted by the RIs 610 to 630 and transmits a new ROAP Trigger message containing total purchase information to the mobile terminal 200 (S707). The total purchase information is created by packaging the purchase information extracted from the ROAP Trigger messages received from the respective RIs.

If the new ROAP Trigger message is received, the mobile terminal 200 displays the total purchase information extracted from the ROAP Trigger message on the display unit. Next, the mobile terminal 200 generates an RO Request message containing CIDs of the content objects which is finally decided by the user and transmits the RO Request message to the broker server 400 (S709). The CID list of the ROAP Trigger Request message may be identical with or different from the CID list of the RO Request message. That is, the CIDs listed on the CID list of the ROAP Trigger Request message can be changed by the user's final decision. In FIG. 7, it is assumed that the CIDs of the DRM content objects to purchase are changed in the RO Request message. The RO Request message transmitted by the mobile terminal 200 is formatted as shown in Table 1.

If the RO Request message is received, the broker server 400 transmits the RO Request message to at least one of the RIs 610 to 630 according to the RI URLs indicated by the RO request message (S711). At this time, the RIs as destination of the RO Request message are determined by the CIDs of the content objects that are finally decided to be purchased by the user. That is, the broker server 400 extracts the CIDs from the RO Request message transmitted by the mobile terminal 200 and generates individual new RO Request messages destined to the respective RIs. The new request message transmitted by the broker server 400 is formatted as shown in Table 1.

In FIG. 7, the RIs 610 and 620 are determined as the destinations of the new RO Request messages due to the change of content objects to be purchased. The broker sever 400 may authenticate the mobile terminal 200 using the RO Request message transmitted by the mobile terminal 200. The authentication may be performed at the initial connection of the mobile terminal and skipped from then.

Both the RO Request messages transmitted by the mobile terminal 200 and the broker server 400 are structured in the following format of Table 1.

TABLE 1

```
<element name="roRequest" type="roap:RORequest"/>
    <complexType name="RORequest">
        <annotation>
            <documentation xml :lang="en">
            Message sent from Device to RI to request an RO.
            </documentation>
        </annotation>
    <complexContent>
        <extension base="roap:Request">
            <sequence>
                <element name="deviceID" type="roap:Identifier">
                <element name="domainID" type="roap:DomainIdentifier" minOccurs="0"/>
                <element name=" riID" type="roap:Identifier"/>
                <element name="nonce" type="roap:Nonce"/>
                <element name="time" type="dateTime"/>
                <element name= "roInfo">
                    <complexType>
                        <sequence maxOccurs="unbounded">
                        <element name="roID" type="ID"/>
                        <element name=" dcfHash" minOccurs="0">
                    <complexType>
                        <sequence>
                            <element name="hash" type="base64Binary"/>
                        </sequence>
                        <attribute name="algorithm" type="anyURI"
                            default=http://wwvv.w3.org/2000/09/xmldsig#sha1/>
                        </complexType>
                    </element>
                </sequence>
                </complexType>
            </element>
            <element name="certificateChain" type="roap:CertificateChain" minOccurs="0"/>
                <element name="extensions" type="roap:Extensions" mninOccurs="0"/>
                <element name="signature" type="base64Binary"/>
            </sequence>
        </extension>
```

TABLE 1-continued

```
    </complexContent>
  </complexType>
```

As shown in Table 1, the RO Request message according to an exemplary embodiment of the present invention includes at least one of parameters such as device ID (deviceID), domain ID (domainID), RI ID (riID), nounce, time, RO information (roInfo), certification chain (certificateChain), extensions, and signature. The nonce element is a parameter generated randomly. The signature element is a digital signature of the mobile terminal and it is included in the RO Request message for verifying the mobile terminal.

The RIs 610 and 620 received the RO Request messages verify the content object on the basis of the RO Request message. Next, each of the RIs 610 and 620 generates ROs indicated by the RO Request message and transmits a RO Response message containing the ROs to the broker server 400 (S713). The RO Response message transmitted by the RI is formatted as shown in Table 2.

Upon receiving the RO Response messages from the RIs 610 and 620, the broker server 400 extracts the ROs from the RO Response messages. The broker server 400 performs batch processing of the digital signatures for inter-authentication between the mobile terminal 200 and the RIs 610 and 620 and then transmits a new RO Response message generated with reference to the RO Response messages received from the RIs 610 and 620 to the mobile terminal 200 (S715). The RO Response message transmitted by the broker server 400 is formatted as shown in Table 2.

The broker server 400 can verify a public key certificate of the mobile terminal 200 using an Online Certificate Status Protocol (OCSP). The OCSP is a protocol to verify a public key certificate of the mobile terminal 200 in real time. That is, the OCSP checks whether the public key certificate of the mobile terminal is aborted. Also, a Certificate Revocation List (CRL) can be used.

The broker server 400 can verify the validity of the public key certificate of the mobile terminal 200 using the OCSP in an initial registration process. Also, public key certificate verification can be performed in response to the request of the broker server 400 or RIs 610 to 630. For example, in a case that a DRM time (a secure time) of a specific content object is not matched with the time of RI (i.e., the difference of the DRM time and the local time of RI or broker server 400 is greater than a threshold value) in the DRM-RO acquisition procedure, the public key certificate of the mobile terminal 200 can be verified. The verification on the public key certificate of the broker server or RI can be performed by exchanging the OCSP Request and OCSP Response messages with an OCSP responder.

The mobile terminal 200 received the RO Response message from the broker server 400 extracts the ROs contained in the RO Response message so as to acquire the ROs of the DRM contents in an aggregate manner.

The RO Response message transmitted by the RIs 610 to 630 or the broker server 400 is structured in the following format of Table 2.

TABLE 2

```
<element name="roResponse" type="roap:ROResponse"/>
<complexType name="ROResponse">
  <annotation>
    <documentation xml:lang="en" >
      Message sent from RI to Device in response to a roRequest
```

TABLE 2-continued

```
      message.
    </documentation>
  </annotation>
  <complexContent>
    <extension base="roap:Response">
      <sequence minOccurs="0">
        <element name="deviceID" type="roap:Identifier"/>
        <element name="riID" type="roap:Identifier"/>
        <element name="nonce" type="roap:Nonce"
 minOccurs="0"/>
        <element name="protectedRO" type="roap:ProtectedRO"
          maxOccurs="unbounded"/>
        <element name="certificateChain"
 type="roap:CertificateChain" minOccurs="0"/>
        <element name="ocspResponse" type="base64Binary"
          minOccurs="0" maxOccurs="unbounded"/>
        <element name="extensions" type="roap:Extensions"
 minOccurs="0"/>
        <element name="signature" type="base64Binary"/>
      </sequence>
        <attribute name="algorithm" type="anyURL"
          default=http://www.w3.org/2000/09/xmldsig
 #sha1/>
    </extension>
  </complexContent>
</complexType>
```

As shown in Table 2, the RO Response message according to an exemplary embodiment of the present invention includes at least one of parameter such as deviceID, riID, nonce, protectedRO, certificateChain, ocspResponse, and signature. The RO Response transmitted by the broker server may further include a broker server ID (brokerID). The brokerID can be replaced by the riID. The nonce element is a random value designated by the RI and can be omitted. The signature element is a digital signature of the RI and it can be used in the authentication procedure. The protected RO may include a plurality of protected ROs. That is the RO Response message contains at least one RO for at least one DRM content object indicated by the RO requested message.

The RO Response message may include protected ROs in the form of "protectedRO" elements for respective DRM content objects, and each protectedRO includes at least one "Permission" element specifying the actual usage of the content object and at least one "constraint" element for restricting the permission on the usage of the content object. That is, the "constraint" may be dependent on the "permission." For example, the permission element may be one of "play", "display", "execute", "print", and "export", and the constraint element may be one of "count", "timed-count", "datetime", "interval", "individual", and "system."

In a case that the broker server 400 and the RIs 610 to 630 are authenticated with each other, the RO Response messages transmitted by the broker server 400 and the RIs 610 to 630 carry the protected ROs without additional security process. If the broker server 400 and the RIs 610 to 630 are not authenticated with each other (i.e., Insecure communication is performed), a Mutual authentication process may be performed between the broker server 400 and the RIs 610 to 630.

The digital signature of the broker server 400 is verified as following process. In a case that the mobile terminal 200 is authenticated (i.e., a secure communication is established), the broker server 400 transmits an RO Response message carrying only its own signature to the mobile terminal 200. On the other hand, if the mobile terminal 200 is not authenticated (i.e., an insecure communication is established), the broker server 400 verifies the digital signatures of the RIs 610 to 630 and transmits an RO Response message containing its signature as well as the digital signature of the RIs 610 to 630. In the case that the digital signatures of all the RIs 610 to 630 are contained in the RO Response message. The message format of the RO Response message may be changed.

Preferably, when it fails to acquire any of the multiple ROs requested by the mobile terminal 200, the broker server 400 or a specific RI reports the information on the RO failed to receive and the reason of the RO acquisition failure. If the acquisition failure message is received from the broker server 400, the mobile terminal 200 outputs an alert such as an acquisition failure information or acquisition failure alarm.

In the above manner, the broker server 400 performs a mutual authentication by verify the digital signatures of the mobile terminal 200 and the RIs 610 to 630. This kind of architecture relieves the mobile terminal 200 from verifying every RI individually since the mobile terminal 200 verifies only the digital signature of the broker server 400.

Although not shown in FIG. 7, the mobile terminal may perform a web transaction with the broker server 400 after transmitting the ROAP Trigger Request message. During the web transaction, the broker server 400 receives the purchase information of the content objects from the respective RIs 610 and 630 and publishes the information on a webpage, and the mobile terminal displays the purchase information on the display unit. At this time, the user can decide the values of the permissions and constraints of the ROs corresponding to the content objects.

For example, if the broker server 400 publishes the purchase information on a web page, the mobile terminal 200 composes a purchase list in response to the user input for selecting the final content objects to be purchased. At this time, the broker server 400 generates at least one ROAP Trigger Request message on the basis of the purchase list received from the mobile terminal 200 and transmits the ROAP Trigger Request message to at least one RI.

Although the broker server-involved batch RO acquisition architecture and method are described with reference to FIGS. 6 and 7, the present invention is not limited thereto. For example, the batch RO acquisition architecture and method can be accomplished by embedding the functionality of the broker server within the respective RIs without an additional broker server. A batch RO acquisition system and method without engagement of the broker server is described hereinafter.

Figure 8:
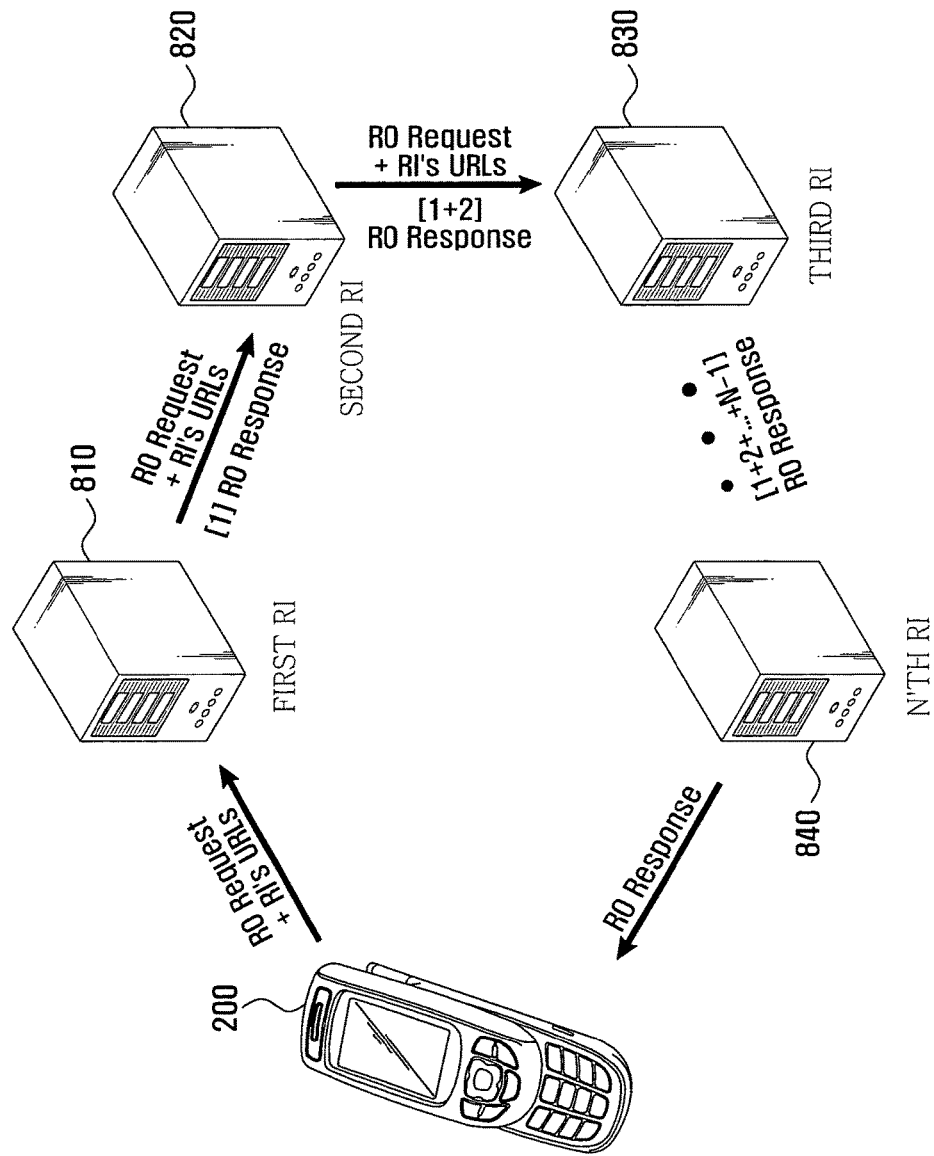
FIG. 8 is a schematic block diagram illustrating a batch RO acquisition system according to another exemplary embodiment of the present invention.

FIG. 8 is a schematic block diagram illustrating a batch RO acquisition system according to another exemplary embodiment of the present invention. In this embodiment, the batch RO acquisition system is deployed in a ring network topology.

Referring to FIG. 8, a mobile terminal 200 transmits an RO Request message to the first RI 810. The RO Request message may contain at least one RI URL including the URL of the first RI 810 that provides the CIDs of the content objects to be purchased.

The mobile terminal 200 extracts at least one CID and at least one RI URL which provides the CID and transmits the RO Request message to the RI URL (in FIG. 8, the URL of the first RI 810).

In the case that multiple RI URLs are contained in the RO Request message, one of the RI URLs is selected according to a preset user configuration. That is, the RI URL can be selected randomly, in an order of preset priority, in an ascendant or descendent order of the RIs, or the like.

The first RI 810 received the RO Request message performs the following processes:
1) Authentication of Device
2) If pass, creating ROs.
3) Adding signature
4) Creating RO Response That is, the first RI 810 authenticates the mobile terminal 200 and, if the mobile terminal passes the authentication process, generates at least one RO and adds its signature to the RO. The authentication process can be performed using the OCSP.

The authentication can be performed in an initial registration of the mobile terminal or in response to a request of the RI. For example, in a case that the DRM time of a specific content object is different from the device time of the RI (i.e., the difference between the DRM time and the RI time is greater than a predetermined value), the RI may request re-authentication. The authentication of the mobile terminal may be performed by exchanging the OCSP Request message and OCSP Response message between the RI and an OCSP Responder.

Next, the first RI 810 creates an RO Response message containing the information on the RO and its signature. The first RI 810 transmits the RO Request message to one of the RI URLs (i.e., the second RI 820) contained in the RO Request message. At this time, the first RI 810 may transmit the RO Response message together with the RO Request message. The first RI 810 may delete its URL from the RO Request message before transmitting the RO Request message to the second RI 820.

If the RO Request message is received, the second RI 820 performs the following processes:
1) Authentication of Device
2) Authentication of previous RI
3) If pass, creating ROs
4) Adding signature (or replacing signature)
5) Creating RO Response That is, if the RO Request message is received, the second RI 820 performs authentication of the mobile terminal 200 and, if the mobile terminal passes the authentication test, creates at least one RO and adds its signature to the RO. The second RI 820 performs the authentication of the first RI 810.

The authentication process on the mobile terminal 200 may skipped. That is, since the mobile terminal 200 is authenticated by the first RI 810, the second RI 820 skips the authentication of the mobile terminal 200 in trust of the authentication by the first RI 810. In this case, the first RI 810 informs the second RI 820 of the authentication of the mobile terminal 200, and the second RI 820 checks whether the RO Request message is received from the mobile terminal 200 or another RI.

The second RI 820 may add its signature to the RO or replace the signature of the first RI 810 with its own signature.

Next, the second RI 820 creates an RO Response message containing the information of the RO and at least one signature. Sequentially, the second RI 820 transmits the RO Request message to one of RI URLs contained in the RO Request message (i.e., the third RI 830). At this time, the RO Response message is transmitted together with the RO Request message. The second RI 820 may delete its URL from the RO Request message before transmitting to the third RI 830.

The third RI 830 and N'th RI 840 perform the identical procedure carried out by the second RI 820. The N'th RI 840 recognizes that there is no other RI to transmit the RO Request message and transmits an RO Response message containing the ROs issued by previous RIs and/or by itself and at least one signature to the mobile terminal 200. The N'th RI 840 can recognize itself as the final RI by checking the RI URLs contained in the RO Request message since the RO Request message received by the final RI containing only one RI URL (when the previous RIs delete their RI URL from the RO Request message). Also, the N'th RI 840 can recognize itself as the final RI by checking the signatures added in the RO Response message.

Figure 9:
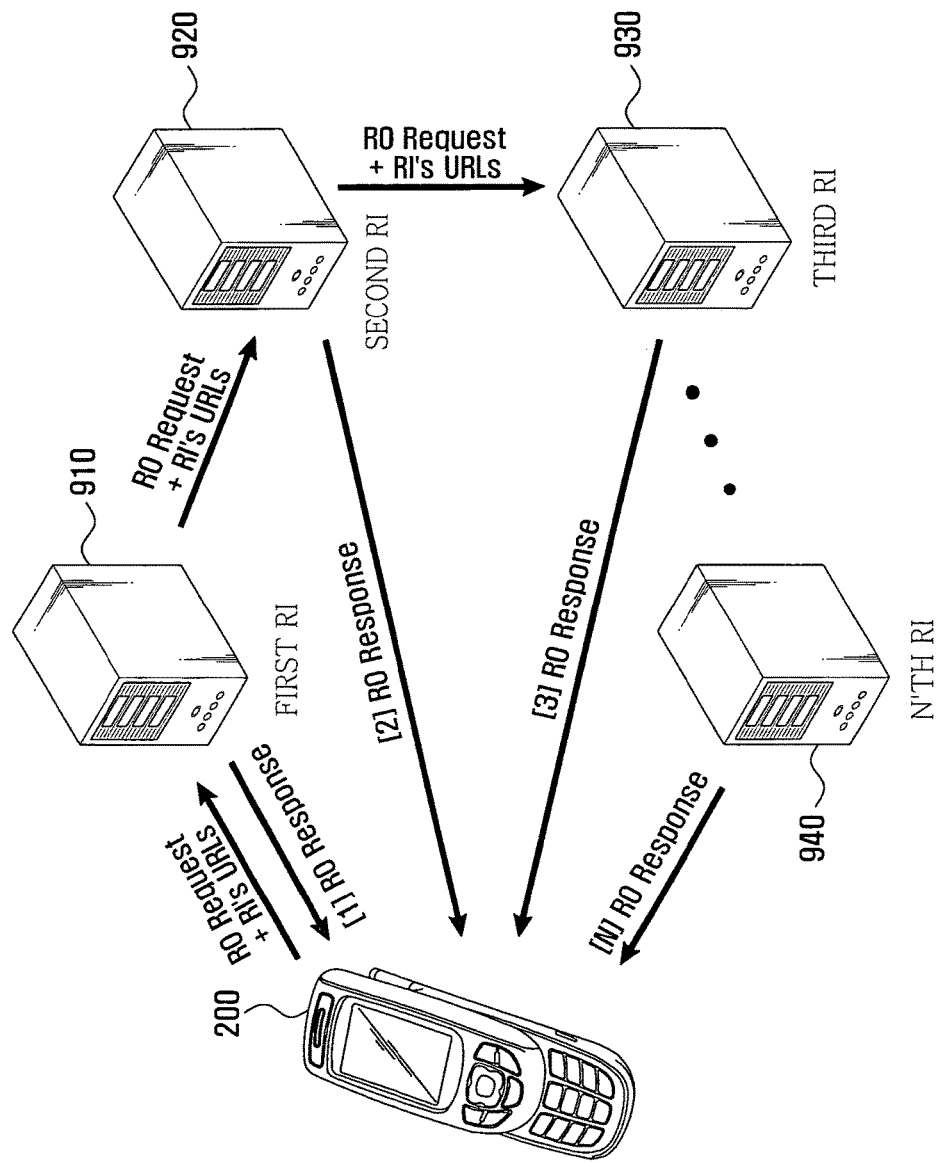
FIG. 9 is a schematic block diagram illustrating an aggregation RO acquisition system according to another exemplary embodiment of the present invention.

FIG. 9 is a schematic block diagram illustrating an aggregation RO acquisition system according to another exemplary embodiment of the present invention. In this embodiment, the batch RO acquisition system is implemented with a push mechanism.

Referring to FIG. 9, a mobile terminal 200 transmits an RO Request message to a first RI 910. The RO Request message contains at least one RI URL including the URL of the first RI 910 that provides CIDs of the content objects to be purchased.

The mobile terminal 200 extracts at least one CID and at least one RI URL which provides the CID of the content object to be purchased and transmits the RO Request message to the RI URL (in FIG. 9, the URL of the first RI 910).

In the case that multiple RI URLs are contained in the RO Request message, one of the RI URLs is selected according to a preset user configuration. That is, the RI URL can be selected randomly, in an order of preset priority, in an ascendant or descendent order or the RIs, or the like.

The first RI 910 receives the RO Request message transmitted by the mobile terminal 200 and performs authentication of the mobile terminal 200 on the basis of the RO Request message. If the mobile terminal 200 passes the authentication test, the first RI 910 creates a RO Response message containing at least one RO and its signature and transmits the RO Response message to the mobile terminal 200. The first RI 910 also transmits the RO Request message to a second RI 920 with reference to the RI URLs contained in the RO Request message. At this time, the first RI 910 may delete its URL from the RO Request message.

If the RO Request message is received from the first RI 910, the second RI 920 performs authentication of the mobile terminal 200. If the mobile terminal 200 passes the authentication test, the second RI 920 creates an RO Response message containing at least one RO and its signature to the mobile terminal 200. The second RI 920 also may perform authentication of the first RI 910. Next, the second RI 920 transmits the RO Request message to one of the RI URLs contained in the RO Request message (in this embodiment, the third RI 930). At this time, the second RI 920 may delete its URL from the RO Request message.

The authentication of the mobile terminal 200 may be skipped. That is, since the mobile terminal 200 is authenticated by the first RI 910, the second RI 920 skips the authentication of the mobile terminal 200 in trust of the authentication by the first RI 910. In this case, the first RI 910 informs the second RI 920 of the authentication of the mobile terminal 200, and the second RI 920 checks whether the RO Request message is received from the mobile terminal 200 or another RI. The second RI 920 may add its signature to the RO or replace the signature of the first RI 910 with its own signature.

The third RI 930 and N'th RI 940 perform the identical procedure carried out by the second RI 920. The N'th RI 940 recognizes that there is no other RI to transmit the RO Request message and transmits an RO Response message. The N'th RI 940 can recognize itself as the final RI by checking the RI URL remained in the RO Request message in which other RI URLs are deleted by previous RIs.

Although not shown in FIGS. 8 and 9, at least one of the RIs verifies a public key certificate of the mobile terminal using the OCSP. The OCSP is a protocol to verify the public key certificate of the mobile terminal 200 in real time. That is, the OCSP checks whether the public key certificate of the mobile terminal is aborted.

In this embodiment, a heterogeneous RI environment is assumed in which the different types of RIs are deployed. In a case that the mobile terminal is not registered with the RIs according to a typical registration standard, or a re-registration of the mobile terminal is required, the ROAP registration process should be performed. In the standard, an ROAP registration protocol and a registration protocol is specified.

The standard specifies that the registration protocol is executed as following situation.

1) at first contact 2) update of the exchanged security information

3) DRM time

That is, the registration protocol is executed when the mobile terminal attempts to initially contact to the RI server, the exchanged security information is required to be updated, and the DRM time (secure time) is inaccurate.

In the heterogeneous RI environment according to an exemplary embodiment, the mobile terminal can register with different types of RIs simultaneously. The mobile terminal also initiates the registration protocol whenever attempting the registration with the respective RIs. As described above, the mobile terminal may initiate the registration protocol only one time with the first RI and skip the initiation of the registration protocol with other RIs.

In order to execute the registration protocol, the mobile terminal and the RI server exchanges messages such as "Device Hello", "RI Hello", "Registration Request", and Registration Response." The mobile terminal and the RI perform the registration procedure by exchanging the above messages. These messages are formatted as shown in Tables 3 to 6.

TABLE 3

```
<element name="deviceHello" type="roap:DeviceHello"/>
<complexType name="DeviceHello">
    <annotation>
        <documentation xml:lang="en">
            Message sent from Device to RI to establish an RI Context.
        </documentation>
    </annotation>
    <complexContent>
        <extension base="roap:Request">
            <sequence>
                <element name="version" type="roap:Version"/>
                <element name="deviceID" type="roap:Identifier"
                    maxOccurs="unbounded"/>
                <element name="supportedAlgorithm" type="anyURI"
                    minOccurs="0" maxOccurs="unbounded"/>
                <element name="extensions" type="roap:Extensions"
                    minOccurs="0"/>
            </sequence>
        </extension>
    </complexContent>
</complexType>
```

Table 3 shows an exemplary "Device Hello" message firstly sent by the mobile terminal in the ROAP registration protocol.

TABLE 4

```
<element name="riHello" type="roap:RIHello"/>
<complexType name="RIHello">
    <annotation>
        <documentation xml:lang="en">
            Message sent from RI to Device in response to a deviceHello
message.
        </documentation>
    </annotation>
    <complexContent>
        <extension base="roap:Response">
            <sequence minOccurs="0">
                <element name="selectedVersion" type="roap:Version"/>
                <element name="riID" type="roap:Identifier"/>
                <element name="selectedAlgorithm" type="anyURI"
maxOccurs="unbounded"
                    minOccurs="0"/>
                <element name="riNonce" type="roap:Nonce"/>
                <element name="trustedAuthorities"
                    type="roap:KeyIdentifiers" minOccurs="0"/>
                <element name="serverInfo" type="base64Binary"
minOccurs="0"/>
                <element name="extensions" type="roap:Extensions"
minOccurs="0"/>
            </sequence>
            <attribute name="sessionId" type="string"/>
        </extension>
    </complexContent>
</complexType>
<complexType name="KeyIdentifiers">
    <sequence minOccurs="0" maxOccurs="unbounded">
        <element name="keyIdentifier"
type="roap:KeyIdentifier"/>
    </sequence>
</complexType>
```

Table 4 shows an exemplary "RI Hello" message which is sent in response to the "Device Hello" message.

TABLE 5

```
<element name="registrationRequest"
type="roap:RegistrationRequest"/>
<complexType name="RegistrationRequest">
    <annotation>
        <documentation xml:lang="en">
            Message sent from Device to RI to request registration.
        </documentation>
    </annotation>
    <complexContent>
        <extension base="roap:Request">
            <sequence>
                <element name="nonce" type="roap:Nonce"/>
                <element name="time"
type="roap:dateTimeOrUndefined"/>
                <element name="certificateChain"
type="roap:CertificateChain"
                    minOccurs="0"/>
                <element name="trustedAuthorities"
type="roap:KeyIdentifiers"
                    minOccurs="0"/>
                <element name="serverInfo" type="base64Binary"
minOccurs="0"/>
                <element name="extensions" type="roap:Extensions"
minOccurs="0"/>
                <element name="signature" type="base64Binary"/>
            </sequence>
            <attribute name="sessionId" type="string"
use="required"/>
        </extension>
    </complexContent>
</complexType>
```

Table 5 shows an exemplary "Registration Request" message which is transmitted from the mobile terminal to the RI for requesting registration.

TABLE 6

```
<element name="registrationResponse"
type="roap:RegistrationResponse"/>
<complexType name="RegistrationResponse">
    <annotation>
        <documentation xml:lang="en">
            Message sent from RI to Device in response to a
registrationRequest message.
        </documentation>
    </annotation>
    <complexContent>
        <extension base="roap:Response">
            <sequence minOccurs="0">
                <element name="riURL" type="anyURI"/>
                <element name="certificateChain"
type="roap:CertificateChain"
                    minOccurs="0"/>
                <element name="ocspResponse" type="base64Binary"
minOccurs="0"
                    maxOccurs="unbounded"/>
                <element name="extensions" type="roap:Extensions"
minOccurs="0"/>
                <element name="signature" type="base64Binary"/>
            </sequence>
            <attribute name="sessionId" type="string"/>
        </extension>
    </complexContent>
</complexType>
```

Table 6 shows an exemplary "Registration Response" message which is transmitted in response to the "Registration Request" message.

Although not shown in FIGS. 8 and 9, if an error occurs at a specific RI (e.g., RO Request or RO Response message is lost), it is preferred for the mobile terminal to display the information on the erroneous RI or erroneous content object and the reason of the error on the display screen.

As described above, the RO acquisition procedure is explained in association with the operations of the mobile terminal, RIs, and broker server. The present invention is not limited thereto. For example, the RO acquisition procedure can be applied between the client terminal such as personal computer and a server, or between two servers.

As described above, the rights object acquisition method and system of the present invention enables a mobile terminal to acquire multiple rights objects in a batch processing manner, resulting in improvement of user convenience. Also, the rights object acquisition method and system of the present invention can be implemented in association with a quantity discount system so as to improve sales of the digital contents, resulting in development of contents business.

Also, the rights object acquisition method and system of the present invention introduces a broker server which provides a single service point for verifying digital signatures of a mobile terminal and RIs so as to reduce complicated authentication processes between a mobile terminal and every RIs, thereby relieving the processing load of the mobile terminal, improving performance of the mobile terminal, and reducing multiple RO acquisition time.

Also, the rights object acquisition method and system of the preset invention enables a mobile terminal to acquire multiple ROs without transmitting RO Request messages to all RIs issuing the ROs, resulting in reducing traffic redundancy.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A rights object acquisition method, the method comprising:
receiving, at a rights issuer, a rights object request message requesting rights objects of a plurality of digital rights management (DRM) content objects from a mobile terminal, wherein the rights object is configured to be decrypted by the mobile terminal to obtain a corresponding license key usable by the mobile terminal;
creating, at the rights issuer, a rights object response message including the rights objects indicated by the rights object request message and at least one signature in response to the rights object request message; and
transmitting, in response to the rights object request message, the rights object response message from the rights issuer to the mobile terminal,
wherein the rights object request message comprises one or more content identifiers and uniform resource locators (URLs) of one or more other rights issuers, each of the other rights issuers providing the rights objects indicated by the rights object request message.

2. The rights object acquisition method of claim 1, further comprising transmitting the rights object request message from the rights issuer to at least one other rights issuer.

3. A rights object acquisition method, the method comprising:
receiving, at a first rights issuer, a rights object request message requesting rights objects of a plurality of digital rights management (DRM) content objects from a mobile terminal, wherein the rights object is configured to be decrypted by the mobile terminal to obtain a corresponding license key usable by the mobile terminal;
creating, at the first rights issuer, a first rights object response message including a first of the rights objects indicated by the rights object request message and a first rights issuer's signature;
checking, at the first rights issuer, whether an address of a second rights issuer is contained in the rights object request message;
transmitting, when no address of the second rights issuer is contained in the rights object request message, the first rights object response message from the first rights issuer to the mobile terminal;
transmitting, when the address of the second rights issuer is contained in the rights object request message, the rights object request message and the first rights object response message from the first rights issuer to a second rights issuer designated in the rights object request message;
creating, at the second rights issuer, a second rights object response message including the first of the rights objects, a second of the rights objects indicated by the rights object request message and a second rights issuer's signature; and
transmitting, when no other rights issuer designated in the rights object request message remains, the second rights object response message from the second rights issuer to the mobile terminal.

4. The rights object acquisition method of claim 3, further comprising authenticating the mobile terminal by the first rights issuer.

5. The rights object acquisition method of claim 4, further comprising adding, at the first rights issuer, a signature of the first rights issuer in the rights object request message.

6. The rights object acquisition method of claim 5, further comprising adding, at the second rights issuer, a signature of the second rights issuer in the rights object request message.

7. The rights object acquisition method of claim 6, further comprising authenticating the first rights issuer by the second rights issuer.

8. A rights object acquisition method comprising:
receiving, at a first rights issuer, a rights object request message requesting rights objects of a plurality of digital rights management (DRM) content objects from a mobile terminal, wherein the rights object is configured to be decrypted by the mobile terminal to obtain a corresponding license key usable by the mobile terminal;
transmitting the rights object request message from the first rights issuer to a second rights issuer designated in the rights object request message;
transmitting, in response to the rights object request message, a rights object response message including one of the rights objects indicated by the rights object request message and a signature of the first rights issuer from the first rights issuer to the mobile terminal; and
transmitting, in response to the rights object request message, a right object response message including a second of the rights objects indicated by the rights object request message and a signature of the second rights issuer from the second rights issuer to the mobile terminal.

9. The rights object acquisition method of claim 8, further comprising authenticating the mobile terminal by the first rights issuer.

10. The rights object acquisition method of claim 8, further comprising authenticating the first rights issuer by the second rights issuer.

* * * * *